Dec. 26, 1961

E. Z. GABRIEL

MECHANICAL COORDINATE CONVERTER, TRIANGLE SOLVER AND MULTIPLIER 3,014,646

Filed Sept. 15, 1959

4 Sheets-Sheet 1

INVENTOR.

Edwin Z. Gabriel

BY

Dec. 26, 1961 E. Z. GABRIEL 3,014,646

MECHANICAL COORDINATE CONVERTER, TRIANGLE SOLVER AND MULTIPLIER

Filed Sept. 15, 1959 4 Sheets-Sheet 2

INVENTOR.

Edwin Z. Gabriel

BY

Dec. 26, 1961

E. Z. GABRIEL

MECHANICAL COORDINATE CONVERTER, TRIANGLE SOLVER AND MULTIPLIER 3,014,646

Filed Sept. 15, 1959

4 Sheets-Sheet 3

INVENTOR.

BY Edwin Z. Gabriel

Dec. 26, 1961 E. Z. GABRIEL 3,014,646

MECHANICAL COORDINATE CONVERTER, TRIANGLE SOLVER AND MULTIPLIER

Filed Sept. 15, 1959 4 Sheets-Sheet 4

INVENTOR.

BY Edwin Z. Gabriel

United States Patent Office 3,014,646
Patented Dec. 26, 1961

3,014,646
MECHANICAL COORDINATE CONVERTER, TRIANGLE SOLVER AND MULTIPLIER
Edwin Zenith Gabriel, Apt. 123D, St. Davids Park, St. Davids, Pa.
Filed Sept. 15, 1959, Ser. No. 840,203
2 Claims. (Cl. 235—61)

Figures 1, 1A, 1B, 2:
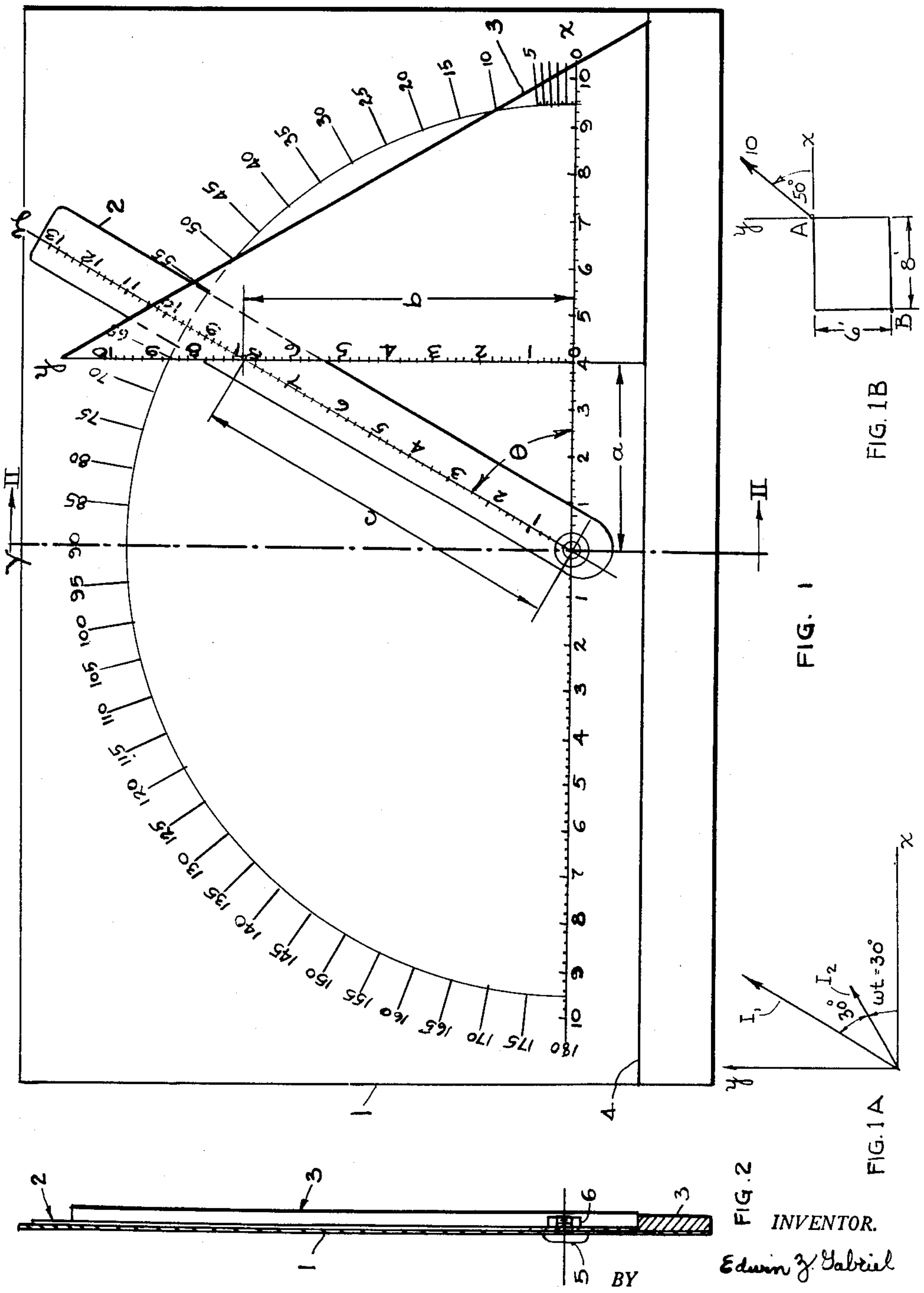

The present invention relates to a manual-type computer adapted to solving triangular geometric problems, such as coordinate conversion from rectangular to polar or from polar to rectangular.

In solving triangular problems, this device is capable of moderate accuracy and comparable to slide-rule accuracy when constructed large enough or when provided with a magnifying glass when the over-all size must be limited to an 8½" x 11" sheet. The purpose of this instrument is not to displace the slide rule but to be a useful tool in cooperation with the slide rule.

Various applications of this computer are listed below.

(1) In solution of triangular problems, to obtain answers, faster than by the use of the Manheim type slide rule.

(2) In electrical and electronic problems, to transform or convert the polar form of a complex number into the rectangular form, or vice versa.

(3) In electrical distribution systems, when the solution of triangles are required for improving the power factor of an electrical system.

(4) In problems of mechanics and aerodynamics, for the addition of vector quantities.

(5) In link-type mechanisms, for solving triangular problems which occur in the analysis or in the synthesis of the mechanism.

(6) For checking the calculated results of any trigonometric problem, including checking and locating the errors of engineering students' papers by teachers of engineering and the sciences.

(7) As an aid to students of engineering and mathematics for solving triangular problems, coordinate conversion, multiplication, division and sketch-making.

It is an object of this invention to obtain the hypotenuse $c$ of an acute angle $\theta$ of a right triangle provided the two legs $a$ and $b$ are known. It is another object of this invention to obtain quickly and easily any missing quantity of an oblique triangle provided sufficient information is available to solve the triangle mathematically. A third objective of this invention is to perform multiplication and division. Still another objective is to demonstrate to students studying trigonometry how sines, cosines and tangents of angles are obtained.

Figure 3:
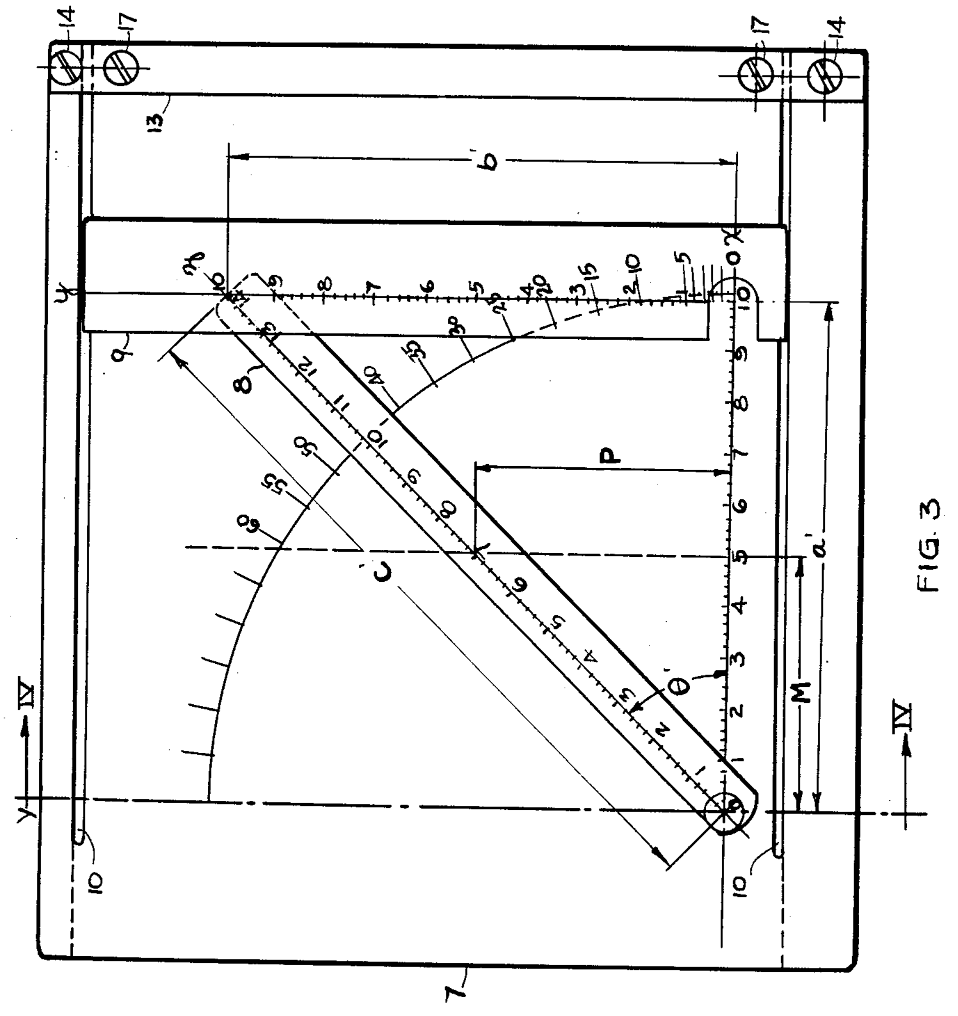
Figure 4:
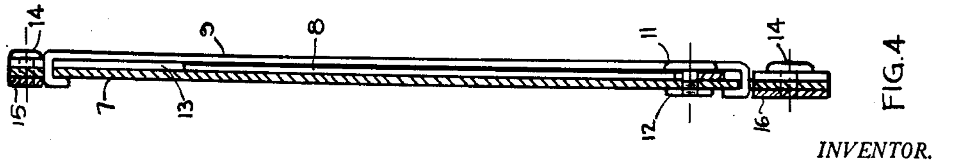
Figures 5, 6, 7, 8, 9:
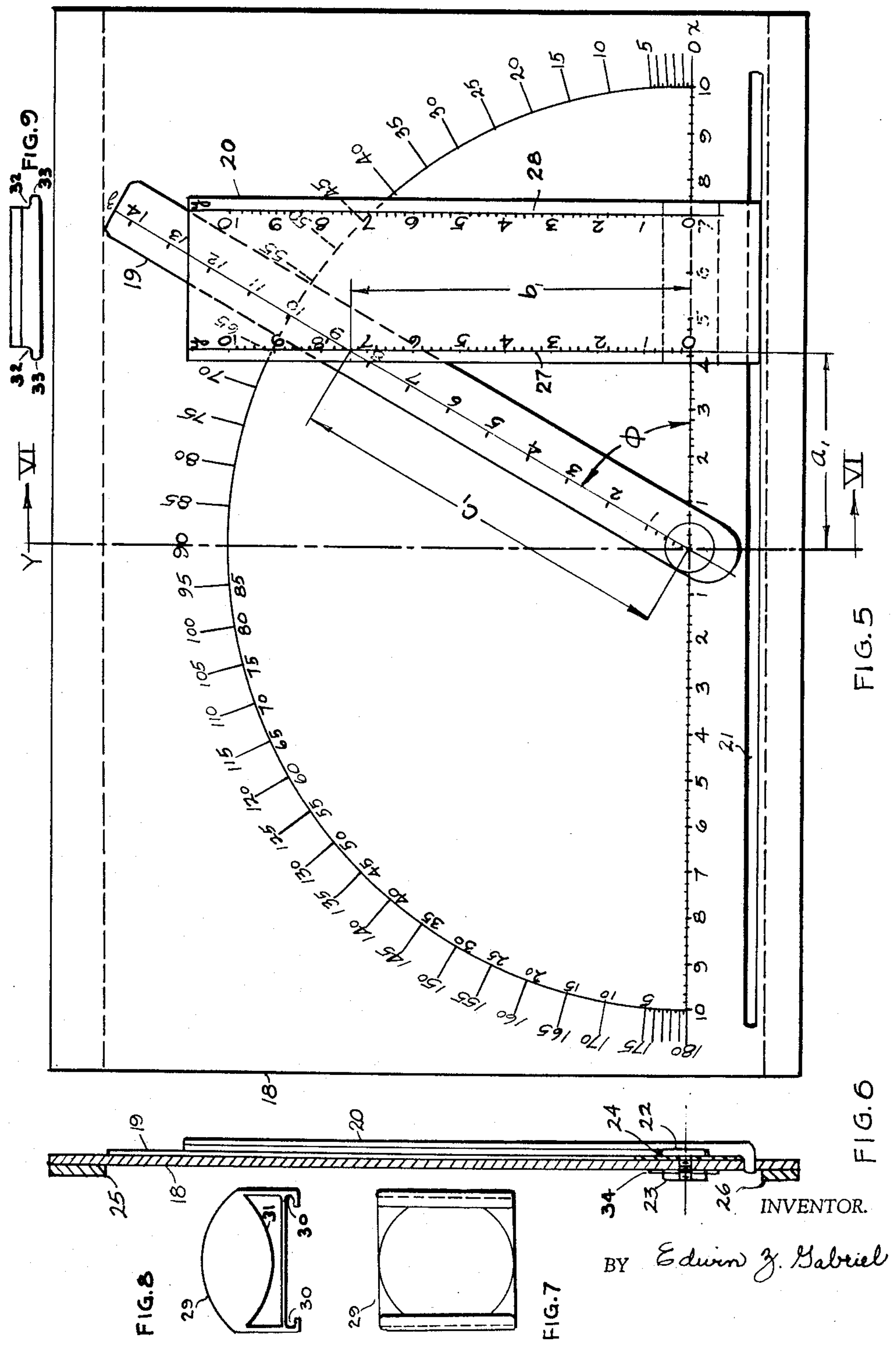
Figures 10, 11, 12, 13, 14, 15:
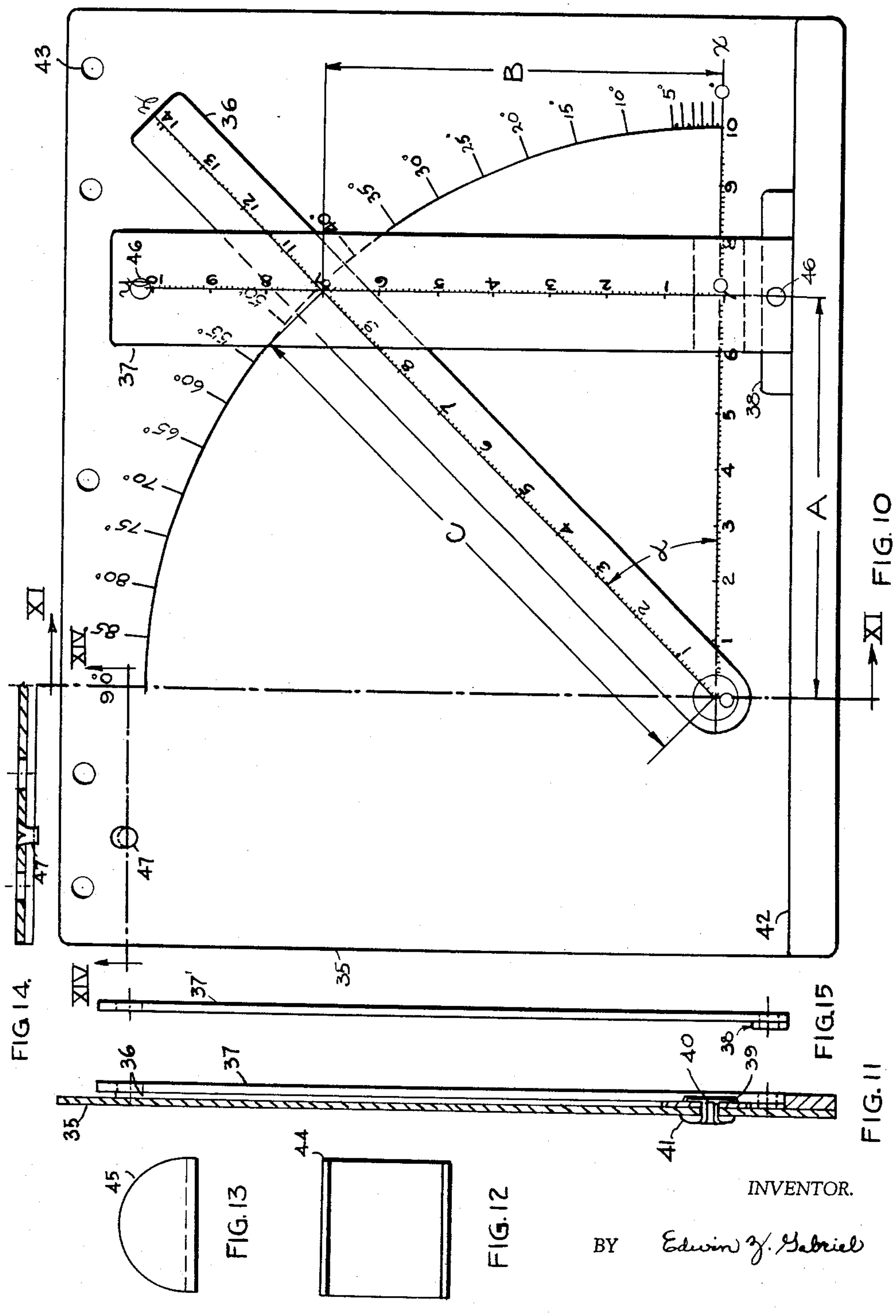

In the drawings:

FIG. 1 is a plan view of an instrument, embodying my invention. FIG. 2 is a sectional view along line II—II in the direction of the arrows. FIG. 3 is a plan view of another embodiment of my invention incorporating two horizontal slots for the translationally sliding member. FIG. 4 is a sectional view along line IV—IV in the direction of the arrows. FIG. 5 is a plan view of still another embodiment of my invention incorporating a single horizontal slot for the sliding member. FIG. 6 is a sectional view along line VI—VI in the direction of the arrows. FIG. 7 is a plan view of the underneath of a magnifier for enlarging the scales' graduations. FIG. 8 is an end view of the magnifier. FIG. 9 is an end view of a translationally movable member containing the y-scale. FIG. 10 is a plan view of still another embodiment of my invention in which the sliding member is designed in the form of a T-square. FIG. 11 is a sectional view along line XI—XI in the direction of the arrows. FIG. 12 is a plan view of the underneath of a magnifier for enlarging the $y$-scale's graduations. FIG. 13 is a side view of the magnifier. FIG. 14 is a fragmentary sectional view along line XIV—XIV in the direction of the arrows. FIG. 15 show an alternate design of the translationally sliding member.

Now referring to the figures, FIG. 1 is a plan view which also illustrates the geometry of the problem. Lengths $a$, $b$ and $c$ form the sides of the triangle. In the example given, lengths $a$ and $b$ are given; side $c$ and angle $\theta$ are required. To see how the above unknown quantities are obtained, slide triangle 3 along edge of member 4 to position indicating given distance $a$, which represents base of triangle. Then rotate member 2 about pivot O until line $z$ crosses edge, or hairline, of triangle at the given value $b$ along the $y$-axis. Distance $c$ may be read along the $z$-axis and its value is found at the point of intersection of its axis with the $y$-axis. Distance $c$ is naturally in the same units as sides $a$ and $b$. The angle $\theta$, which represents the angle the $z$-axis makes with the $x$-axis, is obtained by reading and interpolating, if necessary, the angle in degrees which the $z$-axis makes on the arcuate scale. In the example given, this angle is 60°. In a similar manner, it is possible, with the same degree of ease, to obtain the lengths of the two legs $a$ and $b$ of the triangle, given the hypotenuse $c$ and the angle $\theta$. The operation of rectangular-polar conversion using the computer shown in FIGS. 3 and 4 is the same as for FIGS. 1 and 2. In place of the triangle 3, slide 9, which is guided by horizontal slots, is used for the movable $y$-scale. It is noted that slide 9 contains an indentation at the origin of its $y$-scale in order to enable its $y$-axis to coincide with the $y$-axis of plate 7. If it is preferred to retain the graduations of the $y$-scale intact, then the indentation need only go so far as being tangent with the hairline of the $y$-scale. In order to make the scales of the mechanical computer as large as possible for a given size of plate 7, the maximum angle of the arcuate scale is 60°. All right triangles can still be solved for the unknown angles or sides by orienting the triangle so that the complement of angle $\theta'$ is substituted for $\theta'$ whenever $\theta'$ exceeds 60°.

To perform multiplication with this computer, refer to FIG. 3. Let distance $a'$ be always fixed at 10 and let $b'$ be the multiplier. In this case $b'$ equals 10 units. Then with the strip containing the $z$-axis positioned or held so that its hairline crosses at 10 on the $y$-scale, slide 9 is moved so that its hairline is in the new position M and let M be the multiplicand. In this case M equals 5 units. The product of the two numbers is read at the point on the $y$-scale where the $z$-axis crosses its hairline, which is the distance P in units times a factor of ten (10). In this case P equals 5 and the product therefore is 50. The fact that multiplication is performed can be demonstrated mathematically through the geometry of similar triangles. Hence, by similar triangles, the following mathematical relation is true:

$$\frac{P}{b'}=\frac{M}{a'} \quad (1)$$

$$P=M\frac{b'}{a'} \quad (2)$$

Since $a'=10$ $$10P=Mb' \quad (3)$$

By means of a procedure similar to the above, the arithmetic operation of division may be performed. For example, if the product 50 and the divisor 10 were known, then one would proceed as in multiplication with the slide 9 at position $a'$ and the hairline of the $z$-scale passing through 10 of the $y$-scale thus obtaining a fixed value of $\theta'$. Then slide 9 is moved to the left until graduation 5 on the $y$-scale, representing the product 50, intersects the hairline of the $z$-scale. Distance M now represents the quotient.

An example follows of how this computer may be applied to the addition of alternating currents. The vectors showing the magnitude and initial phase angle with respect to a reference are shown in FIG. 1A.

Let the sine waves of the instantaneous $i_1$ and $i_2$ be the currents in the branches of a divided circuit, and let them join to produce the current $i_0$. If the maximum values of the component waves are 10 and 6 amperes respectively, and the phase relations are as shown in the figure, the problem is to determine the maximum value and initial phase angle of the $i_0$ wave.

The horizontal component of $I_1$ is obtained directly from the computer as described previously, thus:

$$I_{x1}=5.0$$
$$I_{x2}=\underline{5.2}$$
Adding, $$I_{x0}=10.2$$

The vertical component is similarly obtained directly from the computer as:

$$I_{y1}=8.7$$
$$I_{y2}=\underline{3.0}$$
Adding, $$I_{y0}=11.7$$

In polar form $I_0$ is obtained directly from the computer as described previously and found to be $15.5\underline{/48.8^\circ}$ amperes.

As an example of how this computer may be applied to a problem in mechanics, consider the following.

Suppose a 10-lb. force acts on the corner of a 8 ft. by 6 ft. plate at an angle of 50° with the horizontal as shown in FIG. 1B and it is required to determine the moment $M_B$ of the force about point B. The approach to this problem is to resolve the force at A into its $x$ and $y$ components. Thus directly from the computer by the method previously described:

$$F_y=7.7 \text{ lbs.}$$
$$F_y=7.7 \text{ lbs.}$$

The moment of $F_x$ about B is:

$$6.4\times 6=38.4 \text{ lb.-ft.}+\curvearrowright$$

The moment of $F_y$ about B is:

$$7.7\times 8=61.6 \text{ lb.-ft.}-\curvearrowleft$$
$$M_B=38.4-61.6=-23.2 \text{ lb.-ft.}$$

In the above two examples time has been saved in not having to look up the sine and cosine functions in order to obtain the horizontal and vertical components of a vector.

The construction of the two computers shown in FIGURES 1 and 3 is as follows:

In one specific embodiment of the invention illustrated in said drawings, a graduated transparent triangle is used to obtain side $b$ of the triangle configuration, shown in FIG. 1. In this figure the computing mechanism starts with a base plate 1 on which a linear arcuate scale from 0 to 180° is imprinted, preferably in black numerals and graduations. The scale's graduations may be in degrees or in half degrees depending both upon the size of the arcuate scale and the accuracy of readings desired. Although graduations in half degrees are shown up to 5° of arc it is understood that these graduations should be carried through the entire 180° (degrees) of arc. Also along the horizontal 0°–180° line are two linear scales emanating from the origin O, through the central $y$-axis crosses. Each linear horizontal scale proceeds from 1 and continues until 10, and each large division may be subdivided into tenths or in fifths as shown. Member 2 is a graduated slender transparent strip containing the $z$-axis and is pivoted at the origin as shown in FIG. 1. Its scale, however, may be extended to include fifteen of the large divisions. Both the numerals and graduations of this scale should have a different color from those of the base plate, such as red or green, for contrast. A plastic screw 5 is used to hold the slender strip 2 in position. Nut 6 clamps plate 1 and strip 2 together. A transparent triangle 3 slides along strip 4, which provides a straight edge for the triangle. Strip 4 is adhered to plate 1 by means of a synthetic resin. In this computer space has been conserved by presenting only two quadrants of a complete circle. It is conceivable that all four quadrants may be presented, if desired, by providing a flange at the base of the triangle and slot along the $x$-axis for the flange to slide into.

Plate 1 may be a Celluloid sheet, size 8½" by 11", with perforations to fit into a loose-leaf notebook.

FIGURES 3 and 4 show another embodiment of the invention in which a rectangular slide constrained by two horizontal slots is used to replace the triangle of FIG. 1.

In FIG. 3 the computing mechanism is shown suitably supported by plate 7. On plate 7 are imprinted two scales. One is an arcuate scale from 0°–60° graduated in one-half (½) degree increments. The other scale is a horizontal one emanating from the origin and graduated in units and tenths of units. This latter scale represents the $x$-axis. Member 8 is a graduated slender transparent strip similar to 2 containing the $z$-axis. It is pivoted and held in place at the origin of the $x$ and $y$ axis by means of a plastic screw 11 and nut 12. The graduations and units are imprinted in red or green to differentiate them from the black units and graduations on the plate 7. Transparent slide 9 contains a movable $x$-axis, which also is graduated in units and tenths of units. The graduations and units of this scale are black and imprinted on the underside of the slide to reduce parallax. Ten on the $y$-scale is the same distance from zero (0) as ten on the $x$-scale is from zero. Slide 9 is constrained to move translationally along the length of plate 7 by means of two horizontal slots 10 and 11. The ends of slide 9 bend around the slots as shown. Slide 9 may be provided with channels or grooves on both sides to enable a magnifier, similar to the one shown in FIG. 7, to slide up and down the $y$-axis . In this case slide 9 would be thicker and be provided with recess similar to 24 of FIG. 6 instead of the undercut 35 shown. At the underside of plate 7 along the top and bottom run two long strips 15 and 16 which are fastened to the plate by an adhesive. These two strips permit the slide 9 to move freely while the computer is lying on a flat surface. As noted, the slots extend to the end of the right side of the plate. This enables the slide to be easily assembled and also removed from the plate, if necessary, for replacement or cleaning of the underside. Hence, the right side of the plate is held together by means of another strip 13 and fastened in place by screws 14 and 17.

FIGURES 5 and 6 show a third embodiment of the invention in which the rectangular slide is constrained by a single slot instead of two slots as in FIG. 3, while the arcuate scale extends from 0–180° as in FIG. 1. In FIG. 5 the computing mechanism begins with a plate 18 on which are imprinted two scales. One is an arcuate scale graduated in ½-degree increments. On the other horizontal scale the graduations emanate from the origin and are divided into units from 0 to 10 and tenths of units. This latter scale represents the $x$-axis. Member 19 is a graduated thin slender transparent strip similar to 2 of FIG. 1. This strip is pivoted and held in place at the origin of the $x$ and Y axes by means of a plastic screw 22, washer 34, and nut 23. Both the numerals and graduations of the $z$-scale are imprinted in red or green to differentiate them from the black numerals and graduations on plate 18. Transparent slide 20 contains a movable *y*-axis also subdivided into units and tenths of units. Ten (10) on all three scales is the same distance from zero (0). Slide 20 is constrained to move translationally along the length of plates 18 by means of slot 21. The lower end of slide 20 is bent at right angles as shown to fit snugly and slidably into slot 21. Slide 20 also contains recess 24 at its underside to permit its free motion over head of screw 22. Plate 18 also has two long strips 25 and 26 which run along the top and bottom edges of the plate and are held in place by a synthetic resin. These two strips permit the computer to lie flat on a surface without interference by the projections of screw 22 and nut 23.

Using this modified construction, one can solve problems in the same manner as with the computer shown in FIG. 1. Here the lengths of the sides of the triangle being solved are $a_1$, $b_1$ and $c_1$ and the angle is $\phi$. However, slide 20 has two hairlines 27 and 28 with graduations to enable use of the more convenient scale when the slide is located near the extreme right or left of plate 18.

FIG. 9 is an end view of slide 20. Slide 20 may have grooved edges 32 shown in FIG. 9 to provide a magnifier 29 for easy reading of graduations and numerals. The magnifier is shown in FIG. 7, the plan view and in FIG. 8 the end view. Note that now the slide 20 should have a single hairline, with numerals and graduations, located close to its longitudinal center. This would require that slot 21 and base 18 be extended to enable hairline of slide to align with graduation of numeral 10 of the *x*-scale. Magnifier 29 is provided with channels 30 to fit over flanged edges 33 of slide 20. Both the top and underneath portions 31 of magnifier are spherically curved. Also the two longitudinal edges of magnifier are knurled for ease in its handling.

In place of slot 21, a strip to provide a straight edge for slide 20 may be fastened to base plate 18 for the bottom edge of 20 to slide against. In this case, of course, the bottom flange of slide 20 should be omitted.

FIGURES 10 to 15 show still another version of the invention in which the rectangular slide is now in the form of a drafting T-square, the bottom edge of which slides along the side of a channel-shaped straight edge. FIG. 10 is a plan view. FIG. 11 is a fragmentary sectional view along line XIV—XIV in the direction of the arrows. FIG. 12 is the bottom view of magnifier. FIG. 13 is a side view of magnifier. FIG. 14 is a section taken along line *a—a'* of FIG. 10. FIG. 15 shows an alternate design of member 37.

The mechanical computer begins with a plastic sheet 35 on which is imprinted two scales. One is an arcuate scale graduated in ½° increments from 0–90°. The other is horizontal in which the graduations begin from the origin and are divided into units 0–10 and each unit is then subdivided into tenths of a unit. The latter scale represents the *x*-axis. Member 36 is a graduated thin slender transparent strip with a hairline similar to 2 of FIG. 3. This strip is pivoted and held in place at the center of curvature of the arcuate scale by means of a rivet or eyelet 40 and thin washer 41. This strip 36 contains a hairline representing the *z*-scale of which both the numerals and graduations are imprinted in red to differentiate them from the black numerals and graduations on sheet 35. Transparent slide 37 contains a movable vertical *y*-axis. Underneath it is imprinted a scale containing 10 main divisions and each main division is then subdivided into tenths. The numeral ten (10) on all three scales is the same distance from zero (0). Slide 37 is free to move along the length of a channel-shaped straight edge 42. The lower portion of slide 37 has a rectangular strip 38 laminated or bonded to its bottom side so that the bottom edges of both are aligned. Near the top and bottom centers of slide 37 are circular holes 46 large enough to fit over cylindrical projection 47, shown in section 14 of FIGS. 10 and 14. Also near the top of sheet 35 are, if so desired, five perforations spaced to fit into either a 2 or 3 ring binder.

The computer operates to solve problems in much the same manner as the computer shown in FIG. 1. Here the lengths of the sides of the triangle are A and B, the included angle is $\alpha$ and the hypotenuse is C.

FIG. 12 shows the bottom view of a magnifier having flanges 44 spaced so as to straddle across width of slide 37 and designed so it will slide to any position up and down its surface. FIG. 13 is a side view of the magnifier showing cylindrical surface 45. The magnifier is so oriented on slide 37 that it enlarges the distance between graduations of the *y*-scale and will enable easy reading and interpolation at the point of intersection of the hairlines of the *y* and *z* scales.

By turning sheet 35 over, this computer may be used as a drawing board and for making small sketches with the aid of the T-square shown in FIG. 15. FIG. 15 shows an alternate design of member 37 in which vertical slide 37' is raised sufficiently at its lower portion by rectangular strip 38 to allow it to slide over eyelet 40. Triangles may be used for drawing vertical lines by having their bases slide along horizontal straight edge 48 of channel 42. This feature not only simplifies the fabrication of this vertical piece, but also enables its use as a T-square by students and teachers of engineering. As a T-square strip 38 would slide along the left side of sheet 35.

Although four embodiments of this invention have been illustrated and described, it will be understood that many changes, additions, and omissions may be made without departing from the spirit and scope of this invention.

For example, the base plate and scales may be in different sizes and colors, the linear graduations may be subdivided into more divisions or they may be subdivided in a scale other than the decimal, the T-square strip may be designed in the shape of an L and still be capable of performing the function of a T-square. In addition, the base sheet may have a margin, for instance at the left side or bottom side, bent over flat so as to enable either the T-square or the L-square to be held in place in the pocket formed when not in use. Corresponding to the previously described straight edge provided by strip 4, the top edge of the fold just mentioned may be used as a straight edge for the foot of the T-square to slide against. Also the *x*, *y* and *z* scales may have other lengths than those shown. For example, the *x* and *y* scales may have 12 large divisions each and the corresponding *z* scale may have 17 large divisions.

I claim:

1. A mechanical computer for physically presenting a configuration of a triangular geometric problem, comprising a base having an arcuate scale, the arc whereof being centered on said base member and a scale extending linearly from said center and graduated in selected units as a horizontal X-axis and said base having a folded-over strip along one edge thereof paralleling said scale for retaining a movable, transparent Y-axis scale member having a Y-axis scale thereon parallel to the plane of said base, said Y-axis scale member being movable with respect to said base and graduated in units like said linear base scale to form a Y-axis, and a second transparent movable scale member pivoted at said center forming a Z-axis graduated in units like said X and Y scales, said second movable scale overlying said arcuate scale and arranged to ride beneath said Y-axis scale, said X, Y, and Z scales being of different colors to offer contrast.

2. A computer in accordance with claim 1, wherein said folded-over strip provides a straight edge for engagement by said Y-axis scale member at a right angle to said X-axis.

(References on following page)

References Cited in the file of this patent

UNITED STATES PATENTS

| | | |
|---|---|---|
| 1,575,911 | Gomez | Mar. 9, 1929 |
| 2,078,138 | Hansen | Apr. 20, 1937 |
| 2,307,534 | Olson | Jan. 5, 1943 |
| 2,309,675 | Schlomann et al. | Feb. 2, 1943 |
| 2,403,614 | Ross | July 9, 1946 |
| 2,436,352 | Downs | Feb. 17, 1948 |
| 2,495,777 | Schroeder | Jan. 31, 1950 |
| 2,557,965 | Hilsennath et al. | June 26, 1951 |
| 2,845,223 | Mahoney | July 29, 1958 |